US009338820B2

(12) United States Patent
Rikkinen et al.

(10) Patent No.: US 9,338,820 B2
(45) Date of Patent: May 10, 2016

(54) METHOD AND APPARATUS FOR PROVIDING MACHINE-TO-MACHINE COMMUNICATION IN A WIRELESS NETWORK

(75) Inventors: Kari Juhani Rikkinen, Li (FI); Tao Chen, Oulu (FI); Gilles Charbit, Farnborough (GB)

(73) Assignee: Nokia Technologies Oy, Espoo (FI)

( * ) Notice: Subject to any disclaimer, the term of this patent is extended or adjusted under 35 U.S.C. 154(b) by 70 days.

(21) Appl. No.: 13/522,102

(22) PCT Filed: Jan. 15, 2010

(86) PCT No.: PCT/IB2010/050202
§ 371 (c)(1),
(2), (4) Date: Jul. 13, 2012

(87) PCT Pub. No.: WO2011/086426
PCT Pub. Date: Jul. 21, 2011

(65) Prior Publication Data
US 2012/0281658 A1 Nov. 8, 2012

(51) Int. Cl.
*H04W 88/04* (2009.01)
*H04W 72/04* (2009.01)
(52) U.S. Cl.
CPC ............ *H04W 88/04* (2013.01); *H04W 72/048* (2013.01)
(58) Field of Classification Search
None
See application file for complete search history.

(56) References Cited

U.S. PATENT DOCUMENTS

| 2002/0031101 | A1* | 3/2002 | Petite et al. .................... 370/310 |
| 2003/0004784 | A1 | 1/2003 | Li et al. |
| 2005/0048914 | A1 | 3/2005 | Sartori et al. |
| 2006/0141929 | A1* | 6/2006 | Lockie et al. ................. 455/11.1 |
| 2008/0002658 | A1* | 1/2008 | Soliman ......................... 370/343 |
| 2008/0108369 | A1* | 5/2008 | Visotsky et al. .............. 455/455 |

(Continued)

FOREIGN PATENT DOCUMENTS

| EP | 1513272 A1 | 3/2005 |
| WO | 03/077745 A1 | 9/2003 |
| WO | 2008/135094 A1 | 11/2008 |

OTHER PUBLICATIONS

"Machine to Machine, an Ever More Communicating World", Sep. 2005, Webpage available at : http://obc-preprod.obc.ft-hebergement.com/en_EN/innovation/latest_news/hot_topics/tous_les_dossiers/att00009564/ddm_200509uk.pdf.

(Continued)

*Primary Examiner* — Brian Roberts
(74) *Attorney, Agent, or Firm* — Mintz Levin Cohn Ferris Glovsky and Popeo, P.C.

(57) ABSTRACT

An apparatus for providing machine-to-machine communication in a wireless network may include at least one processor and at least one memory including computer program code. The at least one memory and the computer program code may be configured, with the processor, to cause the apparatus to perform at least providing wireless network resources to enable direct downlink communication from a wireless network access point to a relatively low power communication device, allocating wireless network resources to enable uplink data to be provided from the relatively low power communication device to a mobile gateway device within communication range of the relatively low power communication device and utilizing wireless network resources to receive the uplink data from the mobile gateway device at the wireless network access point. A corresponding method and computer program product are also provided.

23 Claims, 8 Drawing Sheets

(56) References Cited

U.S. PATENT DOCUMENTS

| | | | | |
|---|---|---|---|---|
| 2008/0285499 | A1* | 11/2008 | Zhang et al. | 370/315 |
| 2010/0022184 | A1* | 1/2010 | Khoshnevis et al. | 455/7 |
| 2010/0110942 | A1* | 5/2010 | Cai et al. | 370/279 |
| 2011/0194485 | A1* | 8/2011 | Horneman et al. | 370/315 |
| 2012/0213148 | A1* | 8/2012 | Saito et al. | 370/315 |

OTHER PUBLICATIONS

"Mobile Gateway for Vehicle M2M (Machine to Machine) Connectivity", Technical Papers, SAE International, Retrieved on Jul. 15, 2013, Webpage available at : http://papers.sae.org/2002-21-0064/.

"Extending the Reach of Cellular M2M", ABI research, Retrieved on Nov. 16, 2009, Webpage available at : http://www.abiresearch.com/research/1001285-Extending+the+Reach+of+Cellular+M2M.

Huff, "M2M Device Networking: Enabling New Possibilities for Preventive Maintenance", Gateway, Industry Proprietary Protocol, Wireless Network Design, Retrieved on Jul. 15, 2013, Webpage available at : http://www.feedforward.com.au/ethernet_gateway.htm.

Dalibard et al., "White Paper—Machine to Machine—Stakes and Prospects", Orange Business Services, Jun. 2006, 36 pages.

Evans, "Wireless Sensor Networks in Electrical Manufacturing", Proceedings of Electrical Insulation Conference and Electrical Manufacturing Expo, Oct. 26, 2005, pp. 460-465.

Nickerson et al., "A Language for Wireless Sensor Webs", Proceedings of the Second Annual Conference on Communication Networks and Services Research, 2004, 8 pages.

International Search Report and Written Opinion received for corresponding International Patent Application No. PCT/IB2010/050202, dated Oct. 13, 2010, 14 pages.

"New SI proposal: RAN Improvements for Machine-Type Communications", 3GPP TSG-RAN #45, RP-090991, Agenda Item: 12, Sep. 15-18, 2009, 5 pages.

\* cited by examiner

METHOD AND APPARATUS FOR PROVIDING MACHINE-TO-MACHINE COMMUNICATION IN A WIRELESS NETWORK

RELATED APPLICATION

This application was originally filed as PCT Application No. PCT/IB2010/050202 filed Jan. 15, 2010.

TECHNOLOGICAL FIELD

Embodiments of the present invention relate generally to inter-device communications technology and, more particularly, relate to an apparatus and method for providing machine-to-machine communication in a wireless network.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Machine-to-machine (M2M) communication has recently become an area of interest for its growth potential. M2M communication is also exciting to many users and developers for its potential for connecting devices for many different purposes such as smart homes, smart metering, fleet management, remote healthcare, access network operation management and numerous other uses.

M2M communication typically involves the connection of a device or group of devices to a remote server or computer system to enable remote measurement or remote reporting of information. In some cases, M2M communication involves the use of one or more sensors or other nodes or devices to gather information that can be passed to a network or computing device via some form of gateway device. Recently, mobile terminals such as cellular phones have been employed as the gateway device in order to enable remote devices or sensors to provide information to a central location or a network for processing. In some cases, the network may be the Internet or some more localized computing network.

The use of cellular communication systems in M2M applications has been advantageous due to the wide coverage areas that are currently provided by cellular communication systems. Typical endpoint devices in an M2M communication system are relatively small battery operated devices with relatively low transmission power capabilities. Thus, by interfacing with nearby mobile terminals that can connect to a cellular communication system, the endpoint devices can operate at low powers and still provide information to remote computing or storage devices via a mobile terminal acting as a gateway to, for example, a cellular network access point. While the connection between the gateway and the access point in such situations is clearly provided by cellular network resources, the connection between the gateway and the endpoint device is typically some other short range communication radio (e.g., short range radios employing Bluetooth, WLAN and/or the like). Thus, two radios are often required for some M2M applications. In some other applications where direct cellular communication is provided between the access point and the endpoint devices, such devices are typically not small battery operated devices, but instead are larger more powerful machines.

Accordingly, it may be desirable to provide additional alternatives to the existing M2M communication regimes.

BRIEF SUMMARY OF EXAMPLE EMBODIMENTS

A method and apparatus are therefore provided that may enable the provision of M2M communication in a wireless network environment. In this regard, for example, relatively low power devices (specifically referencing low transmission power) such as sensors or other machines in an M2M system may be enabled to receive downlink information directly from a wireless network access point while providing uplink information to the access point via communication with a gateway device using the same wireless network resources. Thus, only one radio may be needed by devices in such an environment in order to perform M2M communication.

In one example embodiment, a method of providing machine-to-machine communication in a wireless network is provided. The method may include providing wireless network resources to enable direct downlink communication from a wireless network access point to a relatively low power communication device, allocating wireless network resources to enable uplink data to be provided from the relatively low power communication device to a mobile gateway device within communication range of the relatively low power communication device and utilizing wireless network resources to receive the uplink data from the mobile gateway device at the wireless network access point.

In another example embodiment, a computer program product for providing machine-to-machine communication in a wireless network is provided. The computer program product may include at least one computer-readable storage medium having computer-executable program code instructions stored therein. The computer-executable program code instructions may include program code instructions for providing wireless network resources to enable direct downlink communication from a wireless network access point to a relatively low power communication device, allocating wireless network resources to enable uplink data to be provided from the relatively low power communication device to a mobile gateway device within communication range of the relatively low power communication device and utilizing wireless network resources to receive the uplink data from the mobile gateway device at the wireless network access point.

In another example embodiment, an apparatus for providing machine-to-machine communication in a wireless network is provided. The apparatus may include at least one processor and at least one memory including computer program code. The at least one memory and the computer program code may be configured, with the processor, to cause the apparatus to perform at least providing wireless network resources to enable direct downlink communication from a wireless network access point to a relatively low power communication device, allocating wireless network resources to enable uplink data to be provided from the relatively low power communication device to a mobile gateway device within communication range of the relatively low power communication device and utilizing wireless network resources to receive the uplink data from the mobile gateway device at the wireless network access point.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
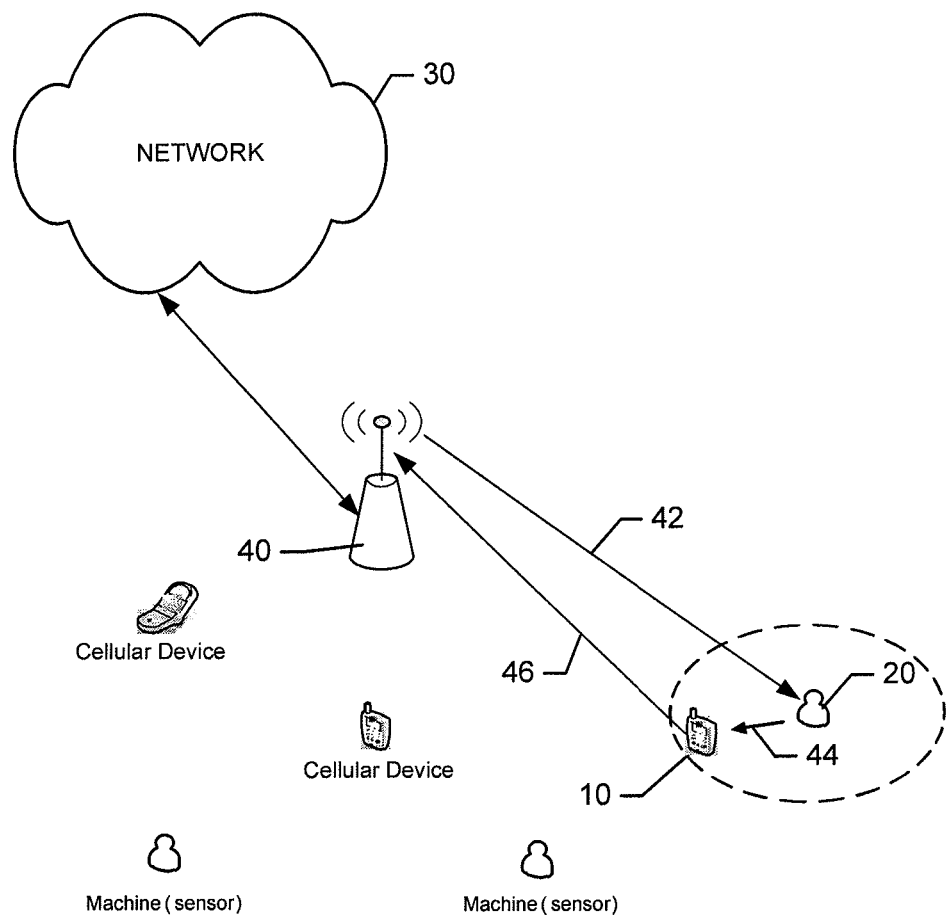
FIG. 1 illustrates one example of a communication system according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a physical storage medium (e.g., volatile or non-volatile memory device), can be differentiated from a "computer-readable transmission medium," which refers to an electromagnetic signal.

As indicated above, mobile terminals acting as gateway devices in an M2M communication system are often required to employ two different radios, particularly when employed with M2M communication systems involving relatively low power (e.g., low transmission power) sensors or sensor networks. Some embodiments of the present invention may provide a mechanism by which sensors or sensor networks may be allocated specific wireless network resources by the access point so that two radios are not required. In some cases, in a wireless network employing cellular network resources, the cellular network access point may allocate specific cellular network resources for communication conducted between the endpoint machine or machines (e.g., the sensors) and the access point and gateway device. For example, the access point may allocate cellular downlink channel resources for downlink direction communications from the access point to the machine(s) and between the gateway device (or relay) and the machine(s). Communications to be provided from the machine(s) to the access point may then be routed through the gateway device and the gateway device can relay those communications via cellular network uplink resources.

FIG. 1 illustrates a generic system diagram in which a device such as a mobile terminal 10, is shown in an example communication environment in which embodiments of the present invention may be employed. As shown in FIG. 1, an embodiment of a system in accordance with an example embodiment of the present invention may include a first communication device (e.g., mobile terminal 10) that may act as a relay or gateway device and one or more machines (e.g., sensor 20) capable of communication with the gateway device and perhaps also each other. In an example embodiment, the mobile terminal 10 and the sensor 20 may be in (or be capable of being placed in) communication with each other and with a network 30 via an access point 40. In some cases, embodiments of the present invention may further include one or more network devices with which the mobile terminal 10 and/or the sensor 20 may communicate to provide, request and/or receive information.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. One or more communication terminals such as the mobile terminal 10 and the sensor 20 may be in communication with each other via the network 30 or via device to device (D2D) communication and each may include an antenna or antennas for transmitting signals to and for receiving signals from a base site (e.g., access point 40), which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the mobile terminal 10 and/or the sensor 20 via the network 30 and the access point 40. In some embodiments, the network 30 may employ one or more mobile access mechanisms such as wideband code division multiple access (W-CDMA), CDMA2000, global system for mobile communications (GSM), general packet radio service (GPRS), long term evolution (LTE) and/or the like may be supported.

In some example embodiments, the mobile terminal 10 may be a mobile communication device such as, for example, a personal digital assistant (PDA), wireless telephone, mobile computing device, camera, video recorder, audio/video player, positioning device (e.g., a global positioning system (GPS) device), game device, television device, radio device, or various other like devices or combinations thereof. As such, the mobile terminal 10 may include a processor and memory for storing instructions, which when executed by the processor, cause the mobile terminal 10 to operate in a particular way or execute specific functionality. The mobile terminal 10 may also include communication circuitry and corresponding hardware/software to enable communication with other devices.

The sensor 20 may be a mobile device such as a mobile sensor or other small battery operated device configured to detect local parameters or environmental conditions for reporting to a remote location. As such, each sensor may include some form of detection device or circuitry to measure a physical parameter or other measurable value along with some communication circuitry for enabling the sensor to communicate information to the mobile terminal 10. Sensors may also include memory and processing circuitry in some instances, and the processing circuitry may direct operation of the corresponding sensors. In some cases, the sensor 20 may be replaced by some other type of machine that may be a mobile or fixed communication device. Other machines and communication devices are also shown in FIG. 1 to illustrate that one access point may serve a plurality of communication devices either employing normal cellular network communications or in a capacity as a gateway device.

As shown in FIG. 1, one or more of the machines (e.g., sensor 20) may be positioned within the coverage area of the access point 40 along with one or more other communication devices (e.g., mobile terminal 10). In general, the machines or sensors may be relatively low power communication devices (in reference to transmission power) and thus, although some machines or sensors may be within range to receive data from the access point 40, the machines or sensors may not have sufficient power to transmit to the access point. Thus, while the access point 40 may be configured to communicate directly with the sensor 20 in the downlink direction utilizing downlink channel resources as indicated by wireless link 42, the wireless link 42 may not support uplink communication. Instead, the sensor 20 may utilize communication with a gateway device (e.g., the mobile terminal 10) that is within its relatively limited communication range to provide uplink information to the access point 40. Thus, the sensor 20 may be configured to communicate with the mobile terminal 10 to provide data, information or message traffic to the mobile terminal 10 for relaying to the access point 40 via wireless link 44. The communication from the sensor 20 to the mobile terminal 10 may be provided via downlink channel resources as well. The access point 40 may designate resource blocks to be used for sensor 20 to mobile terminal 10 communication in this manner. The information provided to the mobile terminal 10 for relaying to the access point 40 may be communicated from the mobile terminal 10 to the access point 40 via uplink channel resources via wireless link 46.

Accordingly, the access point 40 (which may be a base station, e-Node B (eNB), Node B, or other type of access point) may be configured to operate both uplink and downlink channels. The access point 40 of an example embodiment is enabled to communicate with both the sensor 20 and the mobile terminal 10 in the downlink direction. However, the access point 40 of an example embodiment is enabled to communicate only with the mobile terminal 10 (or communication devices other than the sensor 20 and other machines or sensors) in the uplink direction. Moreover, as indicated above, the access point 40 of an example embodiment is configured to allocate network resources to accommodate the communications described above.

The mobile terminal 10 acting as a gateway or relay device according to an example embodiment is configured to operate using both uplink and downlink channel resources. However, with respect to communications as a relay or gateway device, the mobile terminal 10 of this example is configured to receive data from both the sensor 20 (or other machines or sensors) and the access point 40, but is only configured to send data to the access point 40.

Figure 2:
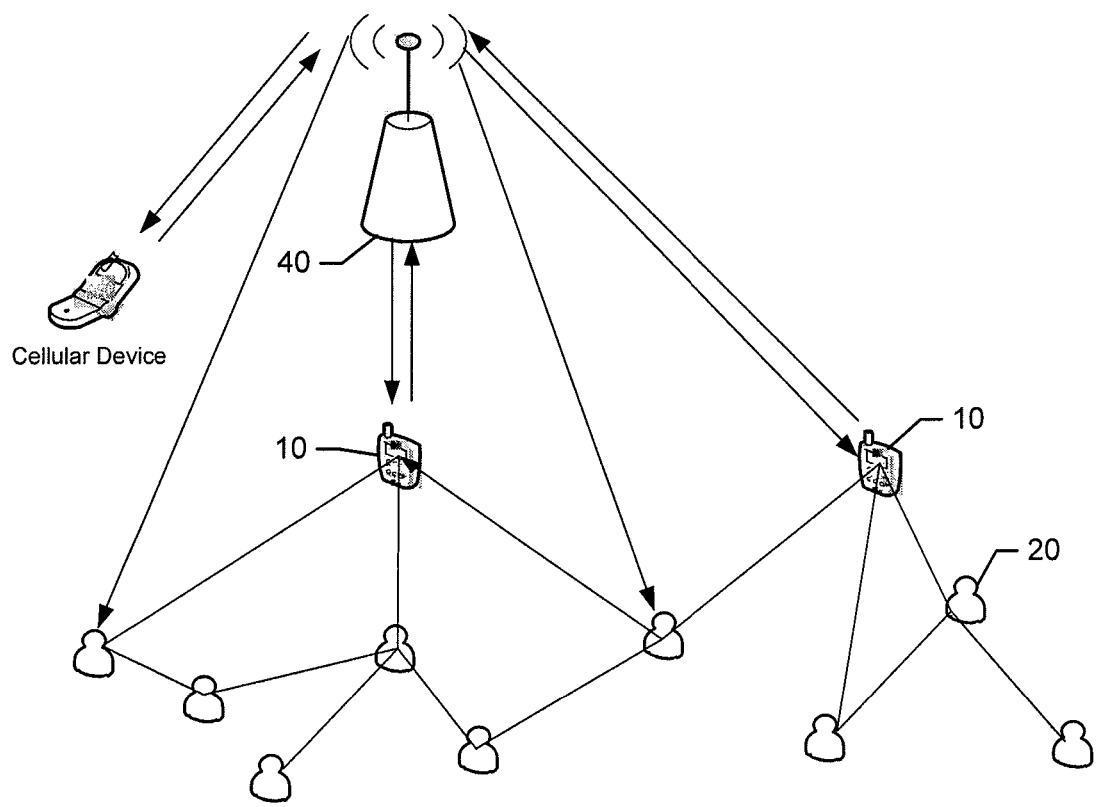
FIG. 2 illustrates an example communication system with multiple networked machines or sensors according to an example embodiment of the present invention.
Figure 3:
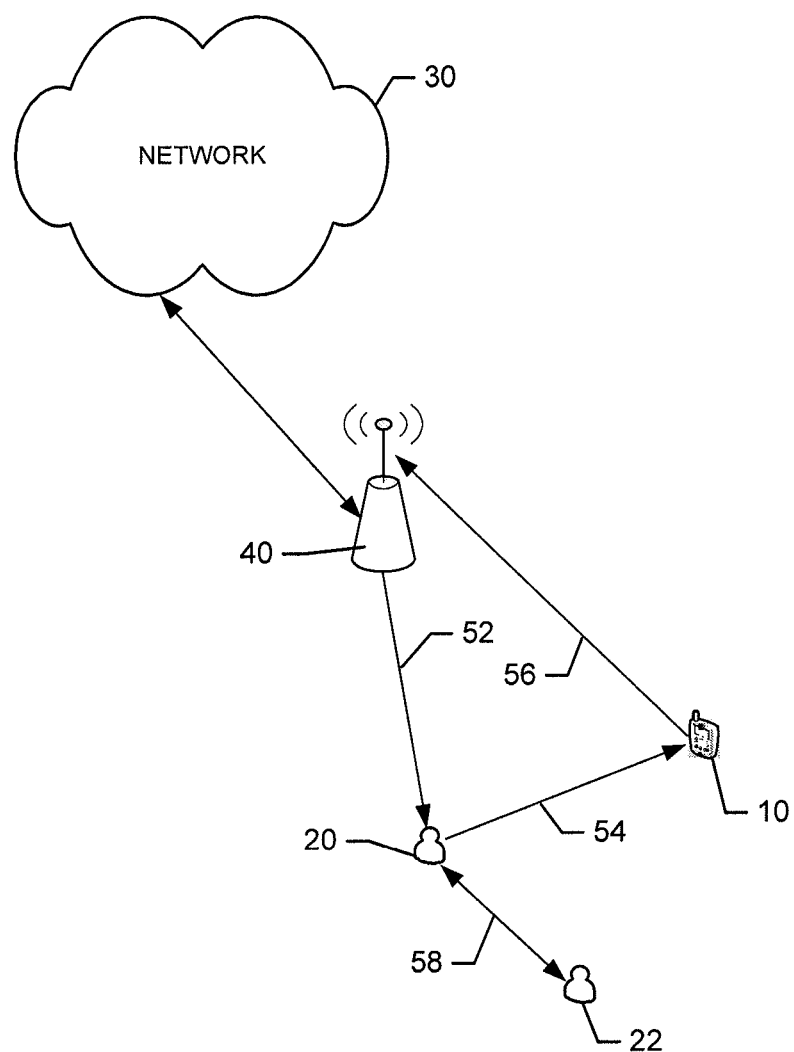
FIG. 3 illustrates another example communication system showing communication links between various entities in connection with a system for providing machine-to-machine communication in a wireless network in accordance with an example embodiment of the present invention.

Machines or sensors such as the sensor 20 that are operating in accordance with this example embodiment may be configured to operate using downlink channel resources designated by the access point. The machines or sensors may therefore send data to the mobile terminal 10 and receive signaling from the access point 40. In some embodiments, the machines or sensors may also receive signaling from other machines or sensors. FIG. 2 illustrates an example of a sensor network in which various sensors or machines (including sensor 20) are enabled to communicate with each other and, in the case of some sensors also with M2M gateway devices such as mobile terminals 10. FIG. 3 further illustrates the communication that may be provided between sensors according to an example embodiment.

As shown in FIG. 3 and described above, the access point 40 may be configured to communicate directly with the sensor 20 in the downlink direction utilizing downlink channel resources as indicated by wireless link 52. In this example, the downlink channel resources may include cellular frequency domain duplexing (FDD) downlink resources. The sensor 20 may be configured to communicate with the mobile terminal 10 to provide data, information or message traffic to the mobile terminal 10 for relaying to the access point 40 via wireless link 54. The communication from the sensor 20 to the mobile terminal 10 may be provided via downlink channel resources including cellular FDD downlink channel frequencies as well. The information provided to the mobile terminal 10 for relaying to the access point 40 may be communicated from the mobile terminal 10 to the access point 40 via uplink channel resources via wireless link 56. As such, the mobile terminal 10 may be enabled to utilize both FDD uplink and downlink resources to communicate with the access point 40. In this example embodiment, the sensor 20 may be enabled to also communicate with a node 22. The node 22 may be another sensor or machine with which the sensor 20 is capable of communicating using cellular FDD downlink frequencies operating with time domain duplexing (TDD) principles as shown by wireless link 58.

Figure 4:
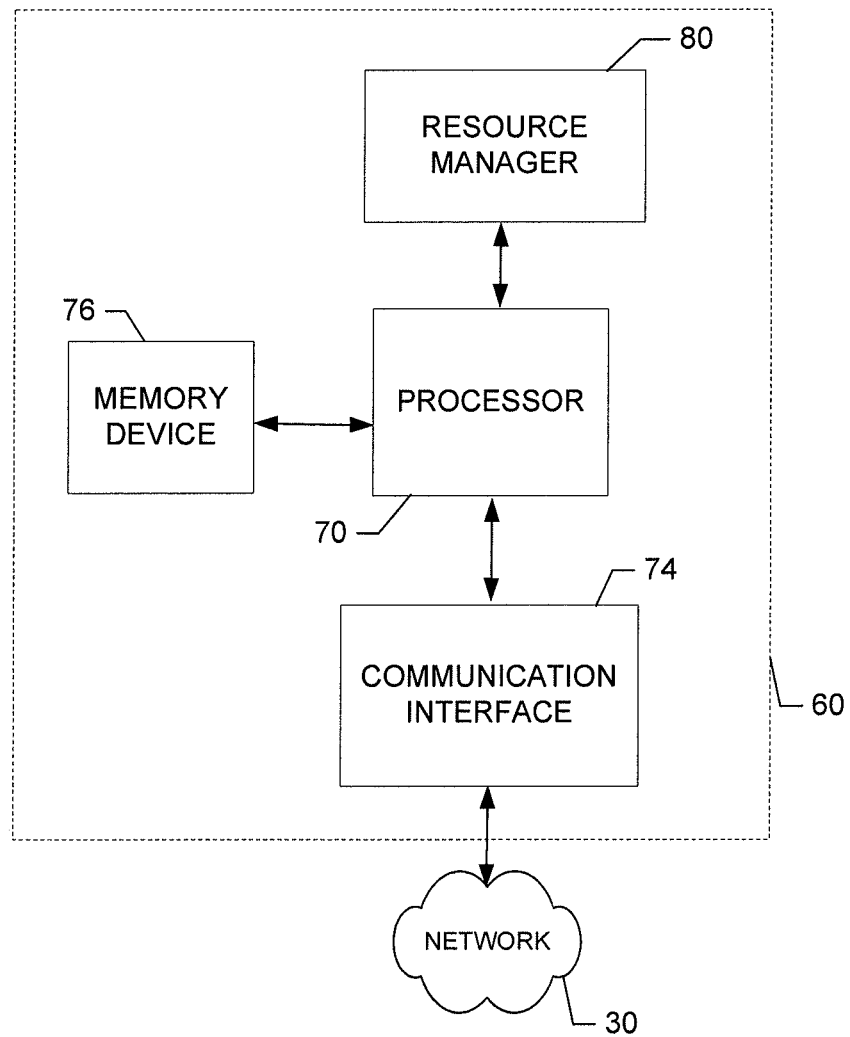
FIG. 4 illustrates a block diagram showing an apparatus for providing machine-to-machine communication in a wireless network in accordance with an example embodiment of the present invention.

In an example embodiment, the access point 40 may be configured to include or otherwise employ an apparatus according to an example embodiment of the present invention. FIG. 4 illustrates a schematic block diagram of an apparatus for providing M2M communication in a wireless network according to an example embodiment of the present invention. An example embodiment of the invention will now be described with reference to FIG. 4, in which certain elements of an apparatus 60 for providing M2M communication in a wireless network are displayed. The apparatus 60 of FIG. 4 may be employed, for example, on an access point or a variety of other devices. However, it should be noted that the components, devices or elements described below may not be mandatory and thus some may be omitted in certain embodiments. Additionally, some embodiments may include further components, devices or elements beyond those shown and described herein.

Referring now to FIG. 4, the apparatus 60 may include or otherwise be in communication with a processor 70, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., an eNB, AP or other network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

In an example embodiment, the processor 70 may be embodied as, include or otherwise control a resource manager 80. The resource manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the resource manager 80 as described herein. Thus, in examples in which software is employed, a device or circuitry (e.g., the processor 70 in one example) executing the software forms the structure associated with such means.

In an example embodiment, the resource manager 80 is configured to control the allocation of wireless communication resources to enable the communications described above in accordance with an example embodiment of the present invention. As such, for example, the resource manager 80 is configured to allocate resources for use by machines or sensors such as the sensor 20 to communicate directly with the access point (e.g., in the downlink direction) to communicate with other machines or sensors (bi-directionally), and/or to communicate with a gateway or relay (e.g., the mobile terminal 10 for uplink to the access point 40 via the mobile terminal 10). In an example embodiment, as described above, the resource manager 80 may be configured to allocate wireless network downlink resources (e.g., cellular downlink channel resources) for use by the sensor 20 to provide signaling to other machines or sensors or to the gateway. The resource manager 80 may also be configured to allocate wireless network uplink resources (e.g., cellular uplink channel resources) to receive data from the sensor 20 via the gateway (e.g., the mobile terminal 10). Uplink and downlink resources may also be managed with respect to communications with the mobile terminal 10 for communications that are not related to data being reported by the sensor 20 or other machines or sensors.

In some cases, the resource manager 80 is enabled to configure subframes of the LTE (or other communication interface) downlink signaling structure. Furthermore, the resource manager 80 may provide information to the mobile terminal 10 and the sensor 20 (or other machines) indicating the configuration to the signaling structure so that the mobile terminal 10 and the sensor 20 may utilize the corresponding signaling structure accordingly. In an example embodiment, the resource manager 80 also provides information to the mobile terminal 10 acting as a gateway to identify the downlink resource blocks that should be monitored by the mobile terminal 10 for possible signals from the sensor 20 (or other machines). Accordingly, during situations in which the mobile terminal 10 is in the vicinity of a machine such as the sensor 20 (e.g., within the machine's communication range), and the mobile terminal 10 receives data in the identified resource downlink resource blocks, the mobile terminal 10 may forward the corresponding data to the access point 40 or send a predetermined message to the access point 40. It should be appreciated that by employing the resource allocation techniques attributable to the resource manager 80 of example embodiments of the present invention, any arbitrary mobile terminal with M2M gateway capability may be employed as a "middleman" to relay M2M communications from machines or sensors to the access point 40. Thus, for example, a device in or accessible via the network 30 may collect information from the machines or sensors for network operation and/or planning purposes. In this regard, in some cases the information collected may be indicative of the number of devices close to a particular location within a cell, or the number of devices that are able to receive a particular transmission in a specific location within the cell.

Figure 5:
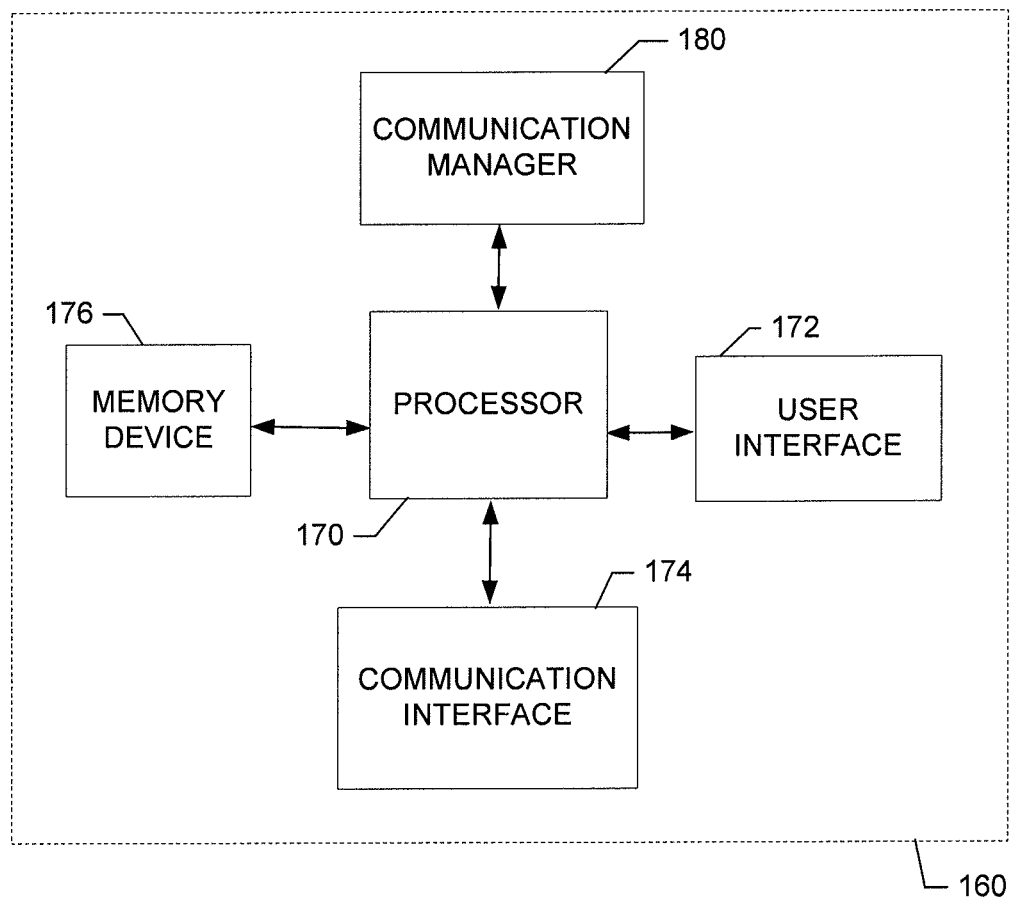
FIG. 5 illustrates a block diagram showing an apparatus for utilizing machine-to-machine communication at a gateway device in a wireless network in accordance with an example embodiment of the present invention.

FIG. 5 is a block diagram of an apparatus 160 that may be employed in connection with a gateway device (e.g., mobile terminal 10) practicing an example embodiment of the present invention. The apparatus 160 may include or otherwise be in communication with a processor 170, a user interface 172, a communication interface 174 and a memory device 176. The processor 170, the communication interface 174, and the memory device 176 may each be similar in general function and form to the processor 70, the communication interface 74 and the memory device 76 described above, so a detailed explanation of these components will not be provided. The user interface 172 may be in communication with the processor 170 to receive an indication of a user input at the user interface 172 and/or to provide an audible, visual, mechanical or other output to the user. As such, the user interface 172 may include, for example, a keyboard, a mouse, a joystick, a display, a touch screen, soft keys, a microphone, a speaker, or other input/output mechanisms. In this regard, for example, the processor 170 may comprise user interface circuitry configured to control at least some functions of one or more elements of the user interface, such as, for example, a speaker, ringer, microphone, display, and/or the like. The processor 170 and/or user interface circuitry comprising the processor 170 may be configured to control one or more functions of one or more elements of the user interface through computer program instructions (e.g., software and/or firmware) stored on a memory accessible to the processor 170 (e.g., memory device 176, and/or the like).

In an example embodiment, the processor 170 may be embodied as, include or otherwise control a communication manager 180. The communication manager 180 may be any means such as a device or circuitry operating in accordance with software or otherwise embodied in hardware or a combination of hardware and software (e.g., processor 170 operating under software control, the processor 170 embodied as an ASIC or FPGA specifically configured to perform the operations described herein, or a combination thereof) thereby configuring the device or circuitry to perform the corresponding functions of the communication manager 180 as described herein. Thus, in examples in which software is employed, a device or circuitry (e.g., the processor 170 in one example) executing the software forms the structure associated with such means. The communication manager 180 may be configured to utilize the resources allocated by the resource manager 80 above to communicate with the access point 40 and the sensor 20.

Figure 6:
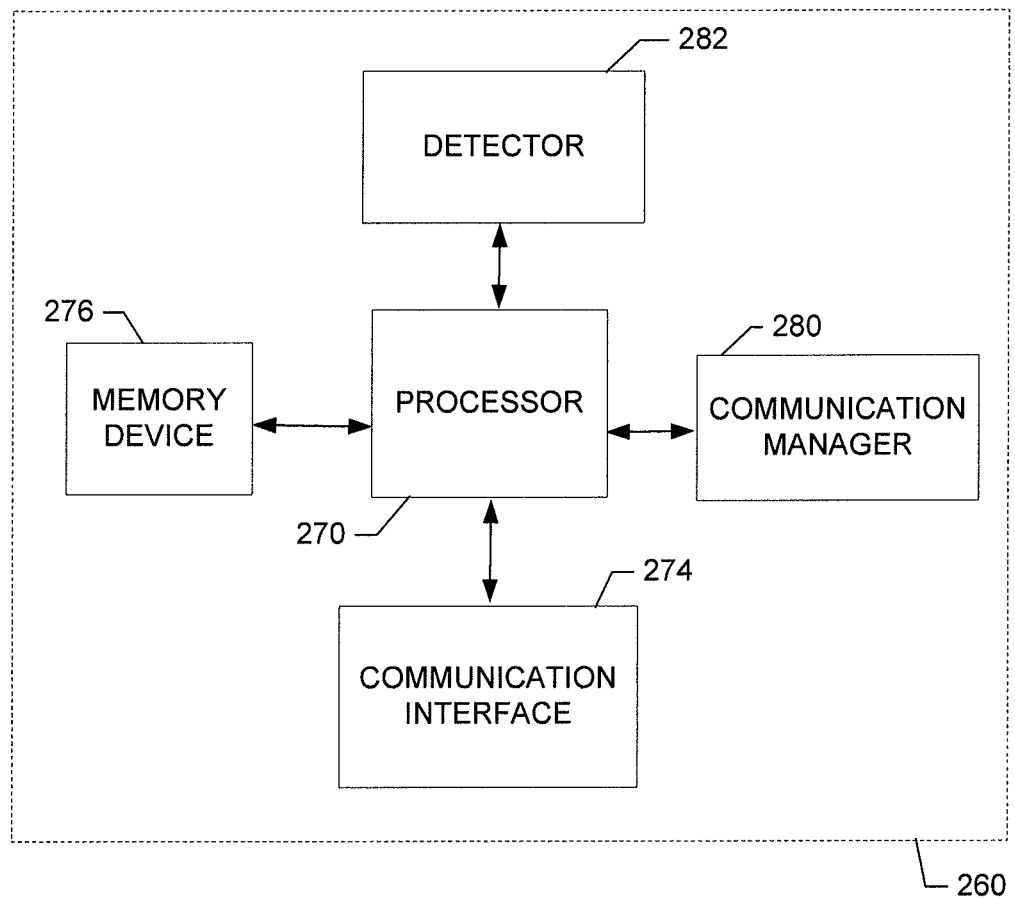
FIG. 6 illustrates a block diagram showing an apparatus for utilizing machine-to-machine communication at a machine or sensor in a wireless network in accordance with an example embodiment of the present invention.

FIG. 6 is a block diagram of an apparatus 260 that may be employed in connection with a machine or sensor (e.g., sensor 20) practicing an example embodiment of the present invention. The apparatus 260 may include or otherwise be in communication with a processor 270, a communication interface 274 and a memory device 276. The processor 270, the communication interface 274, and the memory device 276 may each be similar in general function and form to the processor 70, the communication interface 74 and the memory device 76 described above, so a detailed explanation of these components will not be provided.

In an example embodiment, the processor 270 may be embodied as, include or otherwise control a communication manager 280 and a detector 282. The communication manager 280 and the detector 282 may each be any means such as a device or circuitry operating in accordance with software or otherwise embodied in hardware or a combination of hardware and software (e.g., processor 270 operating under software control, the processor 270 embodied as an ASIC or FPGA specifically configured to perform the operations described herein, or a combination thereof) thereby configuring the device or circuitry to perform the corresponding functions of the communication manager 280 and the detector 282, respectively, as described herein. Thus, in examples in which software is employed, a device or circuitry (e.g., the processor 270 in one example) executing the software forms the structure associated with such means. The communication manager 280 may be configured to utilize the resources allocated by the resource manager 80 above to communicate with the access point 40 and the mobile terminal 10. The detector 282 may be configured to detect some parameter or information for reporting to a remote device via the mobile terminal 10 and the access point 40.

In an exemplary embodiment, the communication manager 280 may be configured to perform at least receiving direct downlink communication from the access point 40 to the sensor 20, receiving (e.g., via the direct downlink communication) an indication of wireless network resources usable for provision of uplink data indirectly to the access point 40 via a mobile gateway device (e.g., the mobile terminal 10), and providing the uplink data to the mobile gateway device using the wireless network resources indicated.

Figure 7:
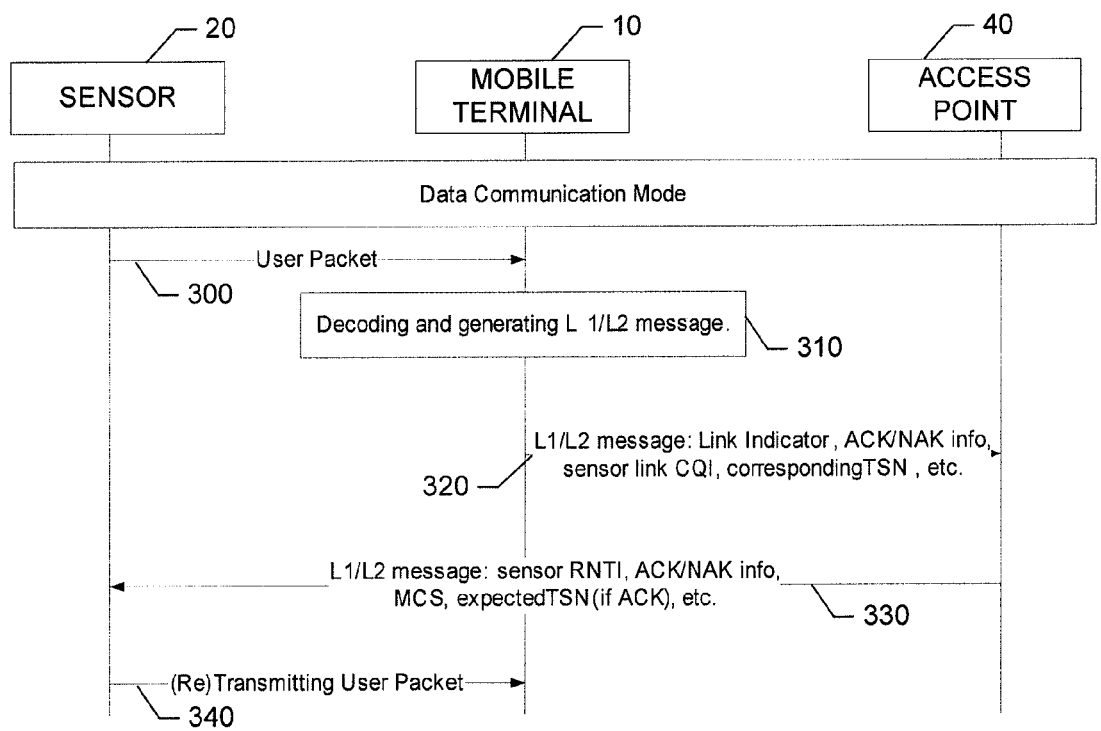
FIG. 7 illustrates a flow diagram showing an asynchronous process for providing machine-to-machine communication in a wireless network according to an example embodiment of the present invention.

FIG. 7 illustrates a control flow diagram showing asymmetric operation of an example embodiment of the present invention. As shown in FIG. 7, the sensor 20 (as an example of a machine) sends a user packet to the mobile terminal 10 (acting as a M2M gateway) at operation 300. The mobile terminal 10 decodes the data sent thereto and generates a message (e.g., a L1/L2 message) including various information items at operation 310. The information may include, for example, a link indicator (e.g., to indicate that the corresponding information is associated with a gateway to sensor link), ACK/NACK information (to indicate correct reception of information from the sensor 20), link channel quality indicator (CQI) (to indicate the channel quality of the gateway to sensor link for provision to the access point 40 to enable the access point to select transmission parameters), and/or transmission sequence number (TSN) in situations where a packet is lost (to enable retransmission of lost packets). The message is then communicated from the mobile terminal 10 to the access point 40 at operation 320. After receiving the message, the access point 40 may generate another message (e.g., a L1/L2 message) and send the message to the sensor 20. The message sent to the sensor may include information regarding a sensor radio network temporary identifier (RNTI) to indicate the sensor for which the message is intended, ACK/NACK information to indicate whether the information is correctly received, MCS information to indicate which modulation and coding scheme (MCS) is to be used by the sensor 20 based on the CQI information provided by the mobile terminal 10, expected TSN information to indicate which packet is expected for ACK or which packet is to be retransmitted for NACK, and/or hybrid automatic repeat request (HARQ) information to indicate a HARQ version number. The access point 40 may communicate the message to the sensor 20 as indicated at operation 330. Responsive to receipt of the message sent at operation 330, the sensor may retransmit missing packets or transmit additional packets as indicated at operation 340.

Since the allocation of resources in some embodiments is coordinated by the resource manager 80 of the access point 40, inter device interference may be reduced. Furthermore, in some embodiments, the M2M machine (e.g., the sensor 20) and the M2M gateway (e.g., the mobile terminal 10) may be synchronized to the same access point. Since the mobile terminal 10 in such cases is assumed to be within the relatively low power range of the sensor 20, the propagation delay may be assumed to be well within a cyclic prefix length. As such, for example, assuming a typical sensor range of 100 meters or less, the maximum propagation delay would be expected to be around 33 microseconds. This may provide for transmission times of the sensor 20 to the mobile terminal 10 on an LTE TDD uplink resource to be sufficiently aligned at the receiver window of the mobile terminal 10.

Accordingly, embodiments of the present invention may provide for relatively small changes to the normal wireless operation of the gateway device and access point in order to support flexible M2M system employment. Thus, for example, automatic data collection systems or wide area sensor systems may be employed via collaboration with nearby cellular network devices. Additionally, the use of one radio interface (instead of requiring two radios) for all communications within the system simplifies the system while still keeping power levels for sensor devices low and battery lives long. Furthermore, by simplifying the integration of devices and communication interfaces, standardization of communications between devices may be simplified as well.

Figure 8:
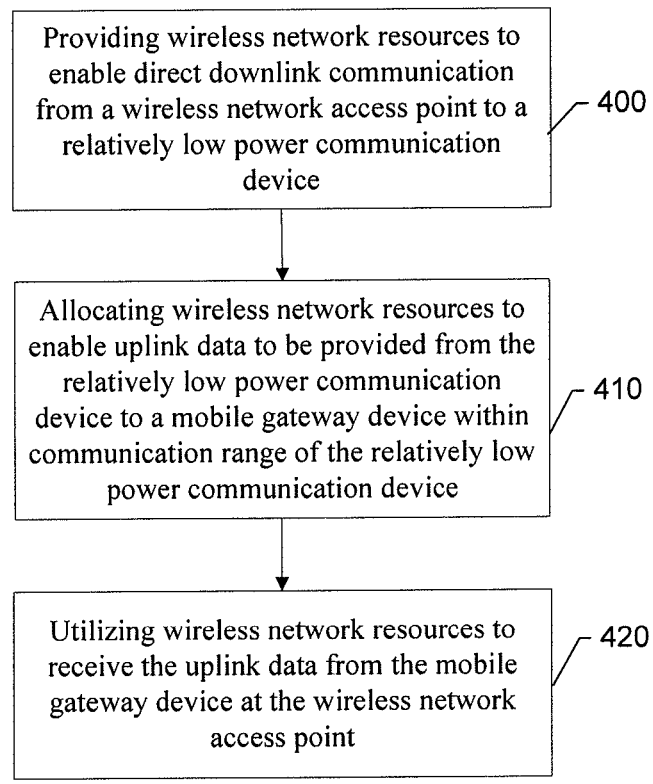
FIG. 8 illustrates a flowchart of a method of providing machine-to-machine communication in a wireless network in accordance with an example embodiment of the present invention.

FIG. 8 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method for providing machine-to-machine communication in a wireless network, as shown in FIG. 8, includes providing wireless network resources to enable direct downlink communication from a wireless network access point to a relatively low power communication device at operation 400 and allocating wireless network resources to enable uplink data to be provided from the relatively low power communication device to a mobile gateway device within communication range of the relatively low power communication device (e.g., a remote machine or sensor) at operation 410. The method may further include utilizing wireless network resources to receive the uplink data from the mobile gateway device at the wireless network access point at operation 420.

In some embodiments, certain ones of the operations above may be modified or further amplified as described below. Modifications or amplifications to the operations above may be performed in any order and in any combination. In an example embodiment, allocating wireless network resources may further include allocating wireless network resources to enable communication between multiple relatively low power communication devices. In some cases, providing, allocating and utilizing wireless network resources may include providing, allocating and utilizing cellular network resources. In an example embodiment, allocating wireless network resources may include allocating selected cellular downlink channel resources and indicating corresponding resource blocks allocated to the relatively low power communication device and the mobile gateway device. In some embodiments, utilizing wireless network resources to receive the uplink data may further include receiving channel quality information descriptive of a communication link between the relatively low power communication device and the mobile gateway device and providing wireless network resources may further include providing an indication of a modulation and coding scheme to be used by the relatively low power communication device for communication with the mobile gateway device based on the channel quality information. In an example embodiment, utilizing wireless network resources to receive the uplink data may further include receiving acknowledgement (ACK) and non-acknowledgement (NACK) messages indicative of successful receipt of packets sent by the relatively low power communication device to the mobile gateway device and providing wireless network resources may further include providing the acknowledgement and non-acknowledgement messages to the relatively low power communication device.

In an example embodiment, an apparatus for performing the method of FIG. 8 above may comprise a processor (e.g., the processor 70) configured to perform some or each of the operations (400-420) described above. The processor may, for example, be configured to perform the operations (400-420) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 400-420 may comprise, for example, the processor 70, the resource manager 80, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
provide wireless network resources to enable direct downlink communication from a wireless network access point to a low power communication device, wherein the wireless network resources comprise a cellular downlink resource allocation and a cellular uplink resource allocation;
allocate the cellular downlink resource allocation to enable uplink data to be provided from the low power communication device to a mobile gateway device within communication range of the low power communication device, wherein the mobile gateway device comprises a mobile cellular terminal, wherein the low power communication device comprises at least one of a sensor or a machine-to-machine communication device, wherein the direct downlink communication and the uplink data utilize the same cellular downlink resource allocation; and
utilize, at the wireless network access point, the cellular uplink resource allocation to receive the uplink data from the mobile gateway device.

2. The apparatus of claim 1, wherein the apparatus is further configured to at least allocate the wireless network resources by at least allocating the cellular downlink resource allocation and indicating corresponding resource blocks allocated to the low power communication device and the mobile gateway device.

3. The apparatus of claim 1, wherein the apparatus is further configured to at least receive channel quality information descriptive of a communication link between the low power communication device and the mobile gateway device in relation to utilizing the cellular downlink resource allocation to receive the uplink data and provide an indication of a modulation and coding scheme to be used by the low power communication device for communication with the mobile gateway device based on the channel quality information in relation to providing the wireless network resources.

4. The apparatus of claim 1, wherein the apparatus is further configured to at least receive acknowledgement and non-acknowledgement messages indicative of successful receipt of packets sent by the low power communication device to the mobile gateway device and forward the acknowledgement and non-acknowledgement messages to the low power communication device.

5. The apparatus of claim 1, wherein the low power communication device includes a low power transceiver to at least transmit to the mobile cellular terminal.

6. The apparatus of claim 1, wherein the low power transceiver comprises a short-range transceiver.

7. The apparatus of claim 1, wherein the downlink resource allocation comprises channel frequencies allocated to a cellular downlink.

8. The apparatus of claim 7, wherein the channel frequencies are frequency division duplexed.

9. A method comprising:
providing wireless network resources to enable direct downlink communication from a wireless network access point to a low power communication device, wherein the wireless network resources comprise a cellular downlink resource allocation and a cellular uplink resource allocation;
allocating the cellular downlink resource allocation to enable uplink data to be provided from the low power communication device to a mobile gateway device within communication range of the low power communication device, wherein the mobile gateway device comprises a mobile cellular terminal, wherein the low power communication device comprises at least one of a sensor or a machine-to-machine communication device, wherein the direct downlink communication and the uplink data utilize the same cellular downlink resource allocation; and
utilizing, at the wireless network access point, the cellular uplink resource allocation to receive the uplink data from the mobile gateway device.

10. The method of claim 9, wherein allocating the wireless network resources comprises allocating the cellular downlink resource allocation and indicating corresponding resource blocks allocated to the low power communication device and the mobile gateway device.

11. The method of claim 9, wherein utilizing cellular downlink resource allocation to receive the uplink data further comprises receiving channel quality information descriptive of a communication link between the low power communication device and the mobile gateway device and wherein providing the wireless network resources further comprises providing an indication of a modulation and coding scheme to be used by the low power communication device for communication with the mobile gateway device based on the channel quality information.

12. A non-transitory computer-readable storage medium including program code which when executed by at least one processor causes operations comprising:
providing wireless network resources to enable direct downlink communication from a wireless network access point to a low power communication device, wherein the wireless network resources comprise a cellular downlink resource allocation and a cellular uplink resource allocation;
allocating the cellular downlink resource allocation to enable uplink data to be provided from the low power communication device to a mobile gateway device within communication range of the low power communication device, wherein the mobile gateway device comprises a mobile cellular terminal, wherein the low power communication device comprises at least one of a sensor or a machine-to-machine communication device, wherein the direct downlink communication and the uplink data utilize the same cellular downlink resource allocation; and utilizing, at the wireless network access point, the cellular uplink resource allocation to receive the uplink data from the mobile gateway device.

13. An apparatus comprising at least one processor and at least one memory including computer program code, the at least one memory and the computer program code configured to, with the processor, cause the apparatus to at least perform:
receive direct downlink communication from a wireless network access point;
receive, via the direct downlink communication, an indication of wireless network resources usable for provision of uplink data indirectly to the wireless network access point via a mobile gateway device, wherein the wireless network resources comprise a cellular downlink resource allocation and a cellular uplink resource allocation, wherein the mobile gateway device comprises a mobile cellular terminal, wherein the apparatus comprises at least one of a sensor or a machine-to-machine communication device, wherein the direct downlink communication and the uplink data to be provided from the apparatus to the mobile gateway device utilize the same cellular downlink resource allocation; and
provide the uplink data to the mobile gateway device using the cellular downlink resource allocation.

14. The apparatus of claim 13, wherein the apparatus is further configured to at least receive channel quality information descriptive of a communication link between the apparatus and the mobile gateway device in relation to provision of the uplink data and receive an indication from the wireless network access point of a modulation and coding scheme to be used by the apparatus for communication with the mobile gateway device based on the channel quality information.

15. A method comprising:
receiving, at a low power communication device, direct downlink communication from a wireless network access point;
receiving, at the low power communication device via the direct downlink communication, an indication of wireless network resources usable for provision of uplink data indirectly to the wireless network access point via a mobile gateway device, wherein the wireless network resources comprise a cellular downlink resource allocation and a cellular uplink resource allocation, wherein the mobile gateway device comprises a mobile cellular terminal, wherein the low power communication device comprises at least one of a sensor or a machine-to-machine communication device, wherein the direct downlink communication and the uplink data to be provided from the low power communication device to the mobile gateway device utilize the same cellular downlink resource allocation; and
providing, at the low power communication device, the uplink data to the mobile gateway device using the cellular downlink resource allocation.

16. The method of claim 15, further comprising receiving channel quality information descriptive of a communication link between the low power communication device and the mobile gateway device in relation to provision of the uplink data and receiving an indication from the wireless network access point of a modulation and coding scheme to be used by the low power communication device for communication with the mobile gateway device based on the channel quality information.

17. A non-transitory computer-readable storage medium including program code which when executed by at least one processor causes operations comprising:
receiving, at a low power communication device, direct downlink communication from a wireless network access point;
receiving, at the low power communication device via the direct downlink communication, an indication of wireless network resources usable for provision of uplink data indirectly to the wireless network access point via a mobile gateway device, wherein the wireless network resources comprise a cellular downlink resource allocation and a cellular uplink resource allocation, wherein the mobile gateway device comprises a mobile cellular terminal, wherein the low power communication device comprises at least one of a sensor or a machine-to-machine communication device, wherein the direct downlink communication and the uplink data to be provided from the low power communication device to the mobile gateway device utilize the same cellular downlink resource allocation; and
providing, at the low power communication device, the uplink data to the mobile gateway device using the cellular downlink resource allocation.

18. An apparatus comprising at least one processor and at least one memory including computer program code, the at least one memory and the computer program code configured to, with the processor, cause the apparatus to at least perform:
receive uplink data from a low power communication device for forwarding to a wireless network access point that provides direct downlink communication to the low power communication device, wherein the mobile gateway device comprises a mobile cellular terminal, wherein the low power communication device comprises at least one of a sensor or a machine-to-machine communication device, wherein the direct downlink communication and the uplink data from the low power communication device utilize a cellular downlink resource allocation of wireless network resources, wherein the wireless network resources comprise the cellular downlink resource allocation and a cellular uplink resource allocation; and
provide the uplink data to the wireless network access point using the cellular uplink resource allocation.

19. The apparatus of claim 18, wherein the apparatus is further configured to at least generate channel quality information descriptive of a communication link between the apparatus and the low power communication device in relation to receipt of the uplink data to enable the wireless network access point to provide an indication of a modulation and coding scheme to be used by the low power communication device for communication with the apparatus based on the channel quality information.

20. The apparatus of claim 18, wherein the apparatus is further configured to at least generate acknowledgement and non-acknowledgement messages indicative of successful receipt of packets sent by the low power communication device and communicate the acknowledgement and non-acknowledgement messages to the wireless network access point for forwarding to the low power communication device.

21. A method comprising:
receiving, at a mobile gateway device, uplink data from a low power communication device for forwarding to a wireless network access point that provides direct downlink communication to the low power communication device, wherein the mobile gateway device comprises a mobile cellular terminal, wherein the low power communication device comprises at least one of a sensor or a machine-to-machine communication device, wherein the direct downlink communication and the uplink data from the low power communication device utilize a cellular downlink resource allocation of wireless network resources, wherein the wireless network resources comprise the cellular downlink resource allocation and a cellular uplink resource allocation; and
providing, at the mobile gateway device, the uplink data to the wireless network access point using the cellular uplink resource allocation.

22. The method of claim 21, further comprising:
generating channel quality information descriptive of a communication link between the mobile gateway device and the low power communication device in relation to receipt of the uplink data to enable the wireless network access point to provide an indication of a modulation and coding scheme to be used by the low power communication device for communication with the mobile gateway device based on the channel quality information.

23. A non-transitory computer-readable storage medium including program code which when executed by at least one processor causes operations comprising:
receiving, at a mobile gateway device, uplink data from a low power communication device for forwarding to a wireless network access point that provides direct downlink communication to the low power communication device, wherein the mobile gateway device comprises a mobile cellular terminal, wherein the low power communication device comprises at least one of a sensor or a machine-to-machine communication device, wherein the direct downlink communication and the uplink data from the low power communication device utilize a cellular downlink resource allocation of wireless network resources, wherein the wireless network resources comprise the cellular downlink resource allocation and a cellular uplink resource allocation; and
providing, at the mobile gateway device, the uplink data to the wireless network access point using the cellular uplink resource allocation.

* * * * *